(12) United States Patent
Ohori

(10) Patent No.: US 11,855,497 B2
(45) Date of Patent: Dec. 26, 2023

(54) MOTOR, AND METHOD FOR MANUFACTURING MOTOR

(71) Applicant: MITSUBA Corporation, Gunma (JP)

(72) Inventor: Ryo Ohori, Gunma (JP)

(73) Assignee: MITSUBA Corporation, Gunma (JP)

( * ) Notice: Subject to any disclaimer, the term of this patent is extended or adjusted under 35 U.S.C. 154(b) by 169 days.

(21) Appl. No.: 17/601,716

(22) PCT Filed: Jun. 23, 2020

(86) PCT No.: PCT/JP2020/024567
§ 371 (c)(1),
(2) Date: Oct. 6, 2021

(87) PCT Pub. No.: WO2021/039065
PCT Pub. Date: Mar. 4, 2021

(65) Prior Publication Data
US 2022/0173642 A1   Jun. 2, 2022

(30) Foreign Application Priority Data
Aug. 26, 2019 (JP) .................. 2019-153841

(51) Int. Cl.
*H02K 15/03* (2006.01)
*H02K 1/28* (2006.01)
(Continued)

(52) U.S. Cl.
CPC .............. *H02K 15/03* (2013.01); *H02K 1/28* (2013.01); *H02K 3/12* (2013.01); *H02K 7/003* (2013.01); *Y10T 29/49012* (2015.01)

(58) Field of Classification Search
CPC ........ H02K 15/03; H02K 1/278; H02K 1/276; H02K 21/14; H02K 15/00; H02K 7/09;
(Continued)

(56) References Cited

U.S. PATENT DOCUMENTS

| | | | |
|---|---|---|---|
| 6,809,439 B2* | 10/2004 | Iwase | H02K 37/14 310/49.01 |
| 2019/0097481 A1 | 3/2019 | Li et al. | |
| 2019/0356186 A1* | 11/2019 | Ichien | H02K 16/02 |

FOREIGN PATENT DOCUMENTS

| JP | H06105505 | 4/1994 |
|---|---|---|
| JP | 4989067 | 8/2012 |

(Continued)

OTHER PUBLICATIONS

"Search Report of Europe Counterpart Application", dated Sep. 5, 2022, pp. 1-10.

(Continued)

*Primary Examiner* — Thiem D Phan
(74) *Attorney, Agent, or Firm* — JCIPRNET

(57) ABSTRACT

Provided are a motor with which dynamic unbalance of a rotor can be suppressed, and a deterioration in the motor characteristics can be reduced, and a method for manufacturing said motor. In a motor unit: a rotor central position, a magnet central position, and a stator central position are offset from one another; a length L1 between inner wall surfaces, facing one another in an axial direction, of magnet holders, an axial direction magnet length L2 of magnets, and an offset length L3 satisfy L1−L2<L3; and first and second holder lengths Lh are the same.

7 Claims, 8 Drawing Sheets

(51) Int. Cl.
*H02K 3/12* (2006.01)
*H02K 7/00* (2006.01)

(58) Field of Classification Search
CPC ...... H02K 1/27; H02K 1/14; Y10T 29/49009; Y10T 29/49012
USPC .......................... 29/598, 596, 604, 607, 732
See application file for complete search history.

(56) References Cited

FOREIGN PATENT DOCUMENTS

| | | |
|---|---|---|
| JP | 2015204734 | 11/2015 |
| JP | 2018026935 | 2/2018 |
| WO | 2017002869 | 1/2017 |

OTHER PUBLICATIONS

"International Search Report (Form PCT/ISA/210) of PCT/JP2020/024567," dated Sep. 24, 2020, with English translation thereof, pp. 1-4.

* cited by examiner

MOTOR, AND METHOD FOR MANUFACTURING MOTOR

CROSS-REFERENCE TO RELATED APPLICATION

This application is a 371 application of the International PCT application serial no. PCT/JP2020/024567, filed on Jun. 23, 2020, which claims the priority benefits of Japan Patent Application No. 2019-153841, filed on Aug. 26, 2019. The entirety of each of the above-mentioned patent applications is hereby incorporated by reference herein and made a part of this specification.

BACKGROUND

Technical Field

The disclosure relates to a motor and a method for manufacturing the motor.

Description of Related Art

For example, among motors, a so-called inner rotor type motor having a stator in which a winding is wound and a rotor rotatably provided on the radial direction inner side of the stator is known as a brushless motor. A permanent magnet (hereinafter referred to as the magnet) is disposed on the outer peripheral part of this type of rotor so that magnetic poles of opposite polarities are alternately arranged along the circumferential direction. In addition, the stator includes a tubular stator core that surrounds the rotor, a plurality of teeth that protrude inward in the radial direction from the stator core, and a winding wound around the teeth.

In the motor, when electric power is supplied to the winding, a predetermined magnetic field is formed in the stator, and in response to this magnetic field, a magnetic attractive or repulsive force is generated between the magnetic field and the magnet, whereby the rotor continuously rotates.

RELATED ART

Patent Document

[Patent Document 1] International Publication No. WO 2017/002869

SUMMARY

Technical Problem

Incidentally, in the conventional rotor structure, if the magnet moves toward the end surface side of the rotation shaft, the center of gravity moves away from the central position of the rotation shaft (rotor), which causes disadvantages such as a large dynamic unbalance with a slight runout.

Further, when the center of gravity of the magnet is moved toward the central position of the rotor, the central position of the magnet deviates from the axial central position of the stator, and the effective magnetic flux of the magnet does not effectively contribute to the rotational torque of the rotor, and there is a possibility that the motor characteristics would deteriorate.

Therefore, the disclosure provides a motor with which dynamic unbalance of a rotor can be suppressed and a deterioration in the motor characteristics can be suppressed, and a method for manufacturing the motor.

Solution to the Problem

In view of the above, a motor according to the disclosure includes: a stator including a winding and a stator core around which the winding is wound; and a rotor attached to one end of a rotation shaft and rotating in response to a magnetic field of the stator. The rotor includes: a rotor core rotating integrally with the rotation shaft; a magnet disposed on an outer peripheral part of the rotor core; and two holders provided at both ends of the rotor core in an axial direction of the rotation shaft to restrict a movement of the magnet in the axial direction. A central position of the stator core in the axial direction, a central position of the rotor core in the axial direction, and a central position of the magnet in the axial direction are deviated from each other. When a length between inner wall surfaces of the two holders facing each other in the axial direction is set to L1, a length of the magnet in the axial direction set to L2, and a length between the central position of the stator core in the axial direction and the central position of the rotor core in the axial direction set to L3, the lengths L1, L2, and L3 satisfy L1−L2<L3. Lengths between end surfaces of the rotor core and the inner wall surfaces of each of the holders are equal.

A motor according to the disclosure includes: a stator including a winding and a stator core around which the winding is wound; and a rotor attached to one end of a rotation shaft and rotating in response to a magnetic field of the stator. The rotor includes: a rotor core rotating integrally with the rotation shaft; a magnet disposed on an outer peripheral part of the rotor core; and two holders provided at both ends of the rotor core in an axial direction of the rotation shaft to restrict a movement of the magnet in the axial direction. Lengths between end surfaces of the rotor core and inner wall surfaces of each of the holders facing the end surfaces of the rotor core in the axial direction are equal. A central position of the stator core in the axial direction, a central position of the rotor core in the axial direction, and a central position of the magnet in the axial direction are deviated from each other. The central position of the magnet in the axial direction is located between the central position of the stator core in the axial direction and the central position of the rotor core in the axial direction.

In the above configuration, the magnet may be in contact with the holder on a side opposite to a deviation direction of the rotor core with respect to the stator core.

In the above configuration, the central position of the rotor core in the axial direction may be closer to another end of the rotation shaft than the central position of the magnet in the axial direction.

In the above configuration, the motor may further include a magnet cover which covers an outer peripheral surface of the magnet and whose inner peripheral surface is in contact with the outer peripheral surface of the magnet.

In the above configuration, a specific gravity of the rotor core may be greater than a specific gravity of the magnet.

A method for manufacturing the motor with the above configuration includes: a magnet cover press-fitting process of press-fitting a magnet cover that covers an outer peripheral surface of the magnet to the outer peripheral surface of the magnet and pressing one end of the magnet cover against the holder in a state where the magnet is disposed on an outer peripheral part of the rotor core; and after the magnet cover press-fitting process, a magnet cover fixing process of bringing another end of the magnet cover into contact with the holder and crimping it to the holder.

Effects

According to the disclosure, dynamic unbalance of the rotor can be suppressed, and a deterioration in the motor characteristics can be suppressed.

DESCRIPTION OF THE EMBODIMENTS

Next, a motor according to an embodiment of the disclosure and a method for manufacturing the motor will be described with reference to the drawings. Further, in the embodiment, a motor 1 with a speed reducer will be described as an example of the motor, but it may be applied to other motors.

<Motor with Speed Reducer>

Figure 1:
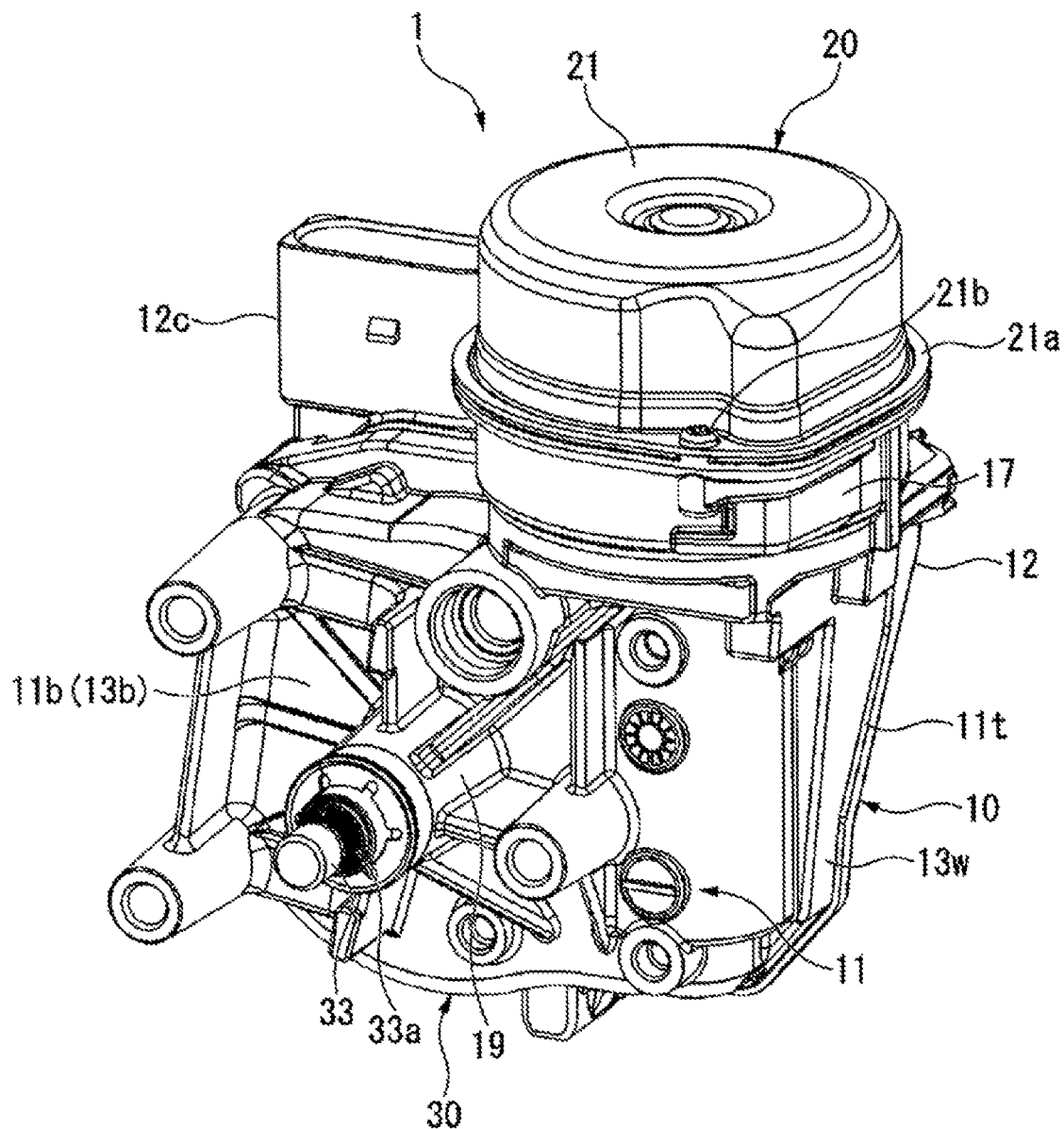
FIG. 1 is a perspective view showing the appearance of a motor with a speed reducer according to an embodiment of the disclosure.

FIG. 1 is a perspective view showing the appearance of the motor 1 with a speed reducer.

As shown in FIG. 1, the motor 1 with the speed reducer is, for example, a drive source for electrical components (such as wipers, power windows, sunroofs, electric seats, and the like) mounted on a vehicle. Specifically, the motor 1 with the speed reducer includes a housing 10 forming an outer casing of the motor 1 with the speed reducer, a motor unit 20 provided in the housing 10, and a speed reducer unit 30 provided in the housing 10 and decelerating and outputting the rotation of the motor unit 20.

Figure 2:
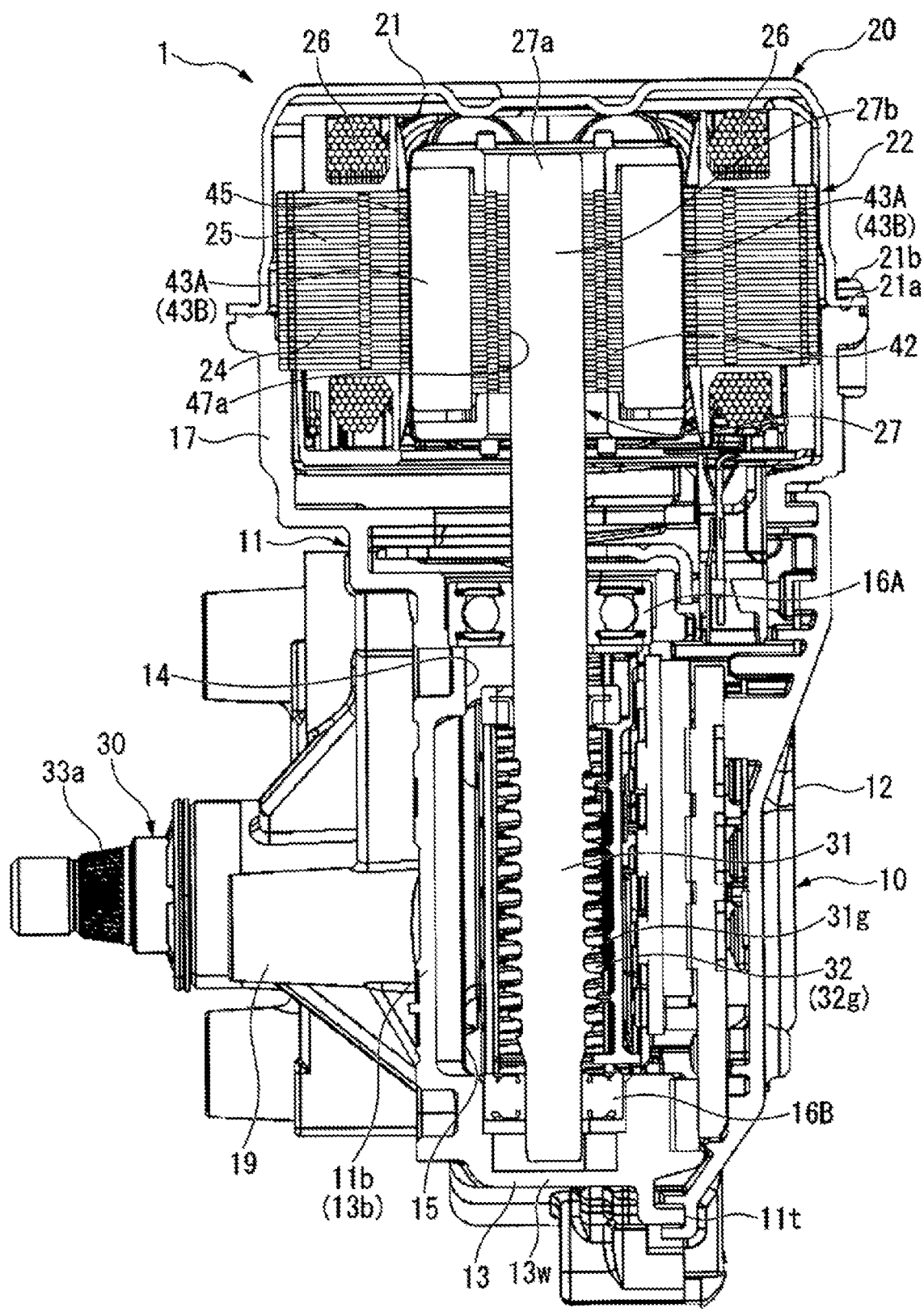
FIG. 2 is a cross-sectional view showing the motor with the speed reducer according to an embodiment of the disclosure.

FIG. 2 is a cross-sectional view showing the motor 1 with the speed reducer.

As shown in FIGS. 1 and 2, the housing 10 is formed of a material having excellent heat dissipation, such as aluminum die casting. The housing 10 is configured by a housing body 11 that holds the motor unit 20 and the speed reducer unit 30, and a cover 12.

A speed reducer housing part 13 that houses the speed reducer unit 30 is formed on one surface side of the housing body 11. The speed reducer housing part 13 has a bottomed shape that is recessed from a top surface part 11t of the housing body 11 toward a back surface part 11b facing the top surface part 11t. The speed reducer housing part 13 is surrounded by a bottom part 13b formed on the back surface part 11b side and a peripheral wall part 13w rising from the outer peripheral part of the bottom part 13b toward the top surface part 11t side.

The speed reducer housing part 13 is formed with a shaft housing groove 14 that houses a worm shaft 31 (to be described later) and a wheel housing recess 15 that houses a worm wheel 32. In the speed reducer housing part 13, bearing parts 16A and 16B that rotatably support the worm shaft 31 (rotation shaft 27) are formed at both end parts of the shaft housing groove 14 in the axial direction.

A motor housing part 17 that extends outward from the peripheral wall part 13w in a tubular shape along the axial direction of the worm shaft 31 is integrally formed on the outer peripheral part of the housing body 11. The motor housing part 17 houses a part of the motor unit 20. A shaft insertion hole (not shown) that penetrates the peripheral wall part 13w and communicates with the bearing part 16A is formed inside the motor housing part 17.

Further, the housing body 11 is integrally formed with a boss part 19 that protrudes from the back surface part 11b toward the side opposite to the top surface part 11t. A through hole (not shown) that communicates with the wheel housing recess 15 is formed penetrating through the boss part 19.

The cover 12 is provided on the top surface part 11t side of the housing body 11 to close the speed reducer housing part 13. The cover 12 is fastened to the housing body 11 by bolts (not shown) at a plurality of locations on the outer peripheral part thereof. A connector receiving part 12c is formed on the cover 12 adjacent to the motor housing part 17 in a state where the cover 12 is attached to the housing body 11. The connector receiving part 12c has a tubular shape, and an external power supply connector is connected to the connector receiving part 12c.

<Motor Unit>

Figure 3:
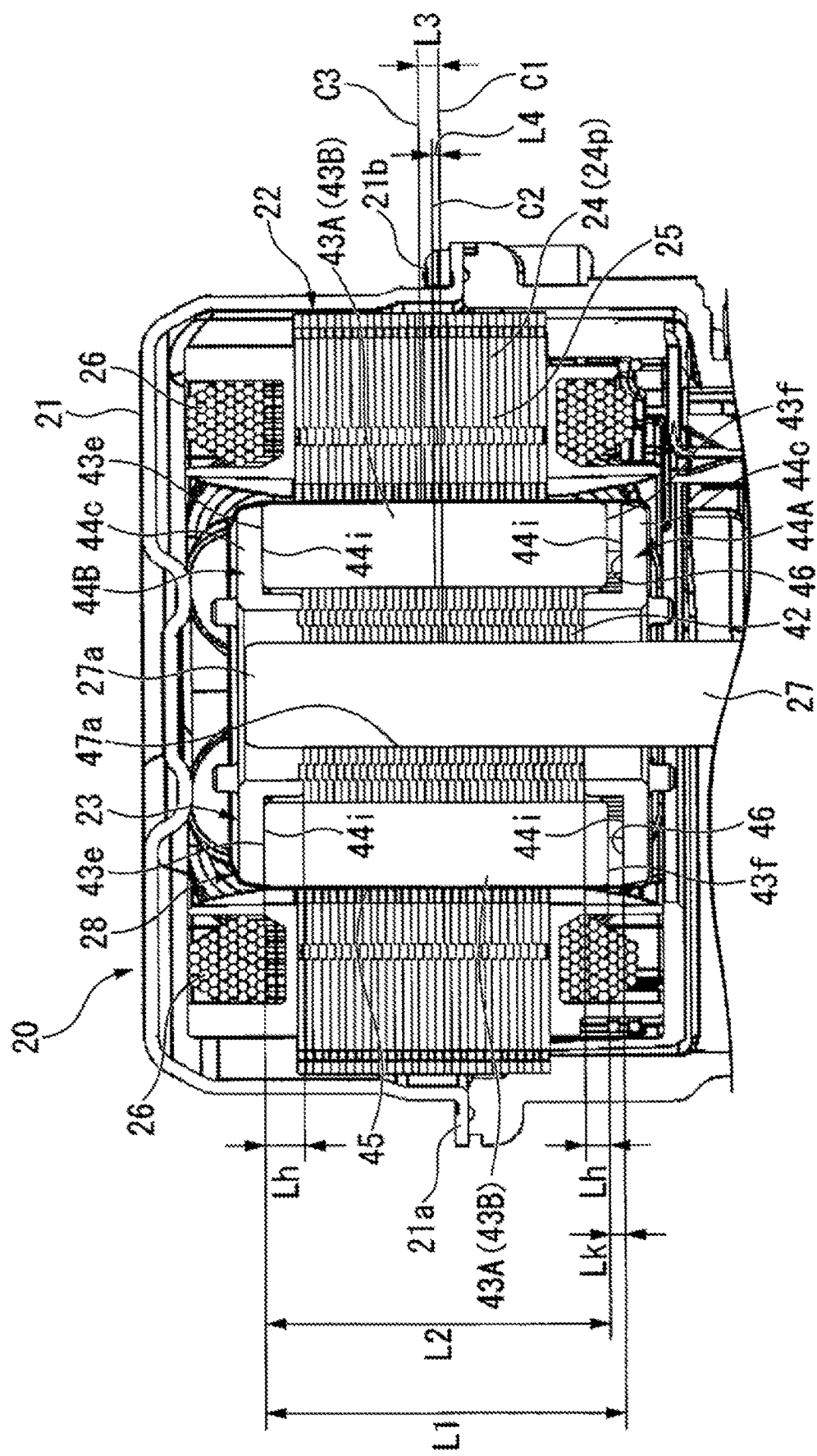
FIG. 3 is a cross-sectional view showing the motor unit according to an embodiment of the disclosure.

FIG. 3 is a cross-sectional view showing the motor unit 20.

As shown in FIG. 3, the motor unit 20 includes a motor cover 21 attached to the motor housing part 17, a stator 22 in a cylindrical shape housed in the motor housing part 17 and the motor cover 21, and a rotor 23 provided on the radial direction inner side of the stator 22 and provided to be rotatable with respect to the stator 22.

The motor cover 21 is a member made of metal such as iron, and is formed into a bottomed cylindrical shape by, for example, press working with a deep drawing. A flange 21a (see also FIG. 1) is formed at the open end of the motor cover 21 to protrude outward in the radial direction. The motor cover 21 is connected to the motor housing part 17 by a bolt 21b inserted through the flange 21a.

The stator 22 is disposed along the inner peripheral surface of the motor cover 21. The stator 22 includes a stator core 24 formed in a substantially cylindrical shape, a plurality of teeth 25 protruding inward in the radial direction from the stator core 24, and a winding 26 wound around the stator core 24.

The stator core 24 is formed by laminating a plurality of steel plates 24p. Further, the stator core 24 is not limited to the case of being formed by laminating a plurality of metal plates, and may be formed by press-molding soft magnetic powder, for example. The outer peripheral surface of the stator core 24 formed in this way is fitted to the inner peripheral surface of the motor cover 21.

The teeth 25 are formed at equal intervals in the circumferential direction along the radial direction inner side of the stator core 24. The winding 26 is wound around the teeth 25.

The winding 26 generates a magnetic flux for rotating the rotor 23 by a current supplied from a controller board (not shown).

Figure 4:
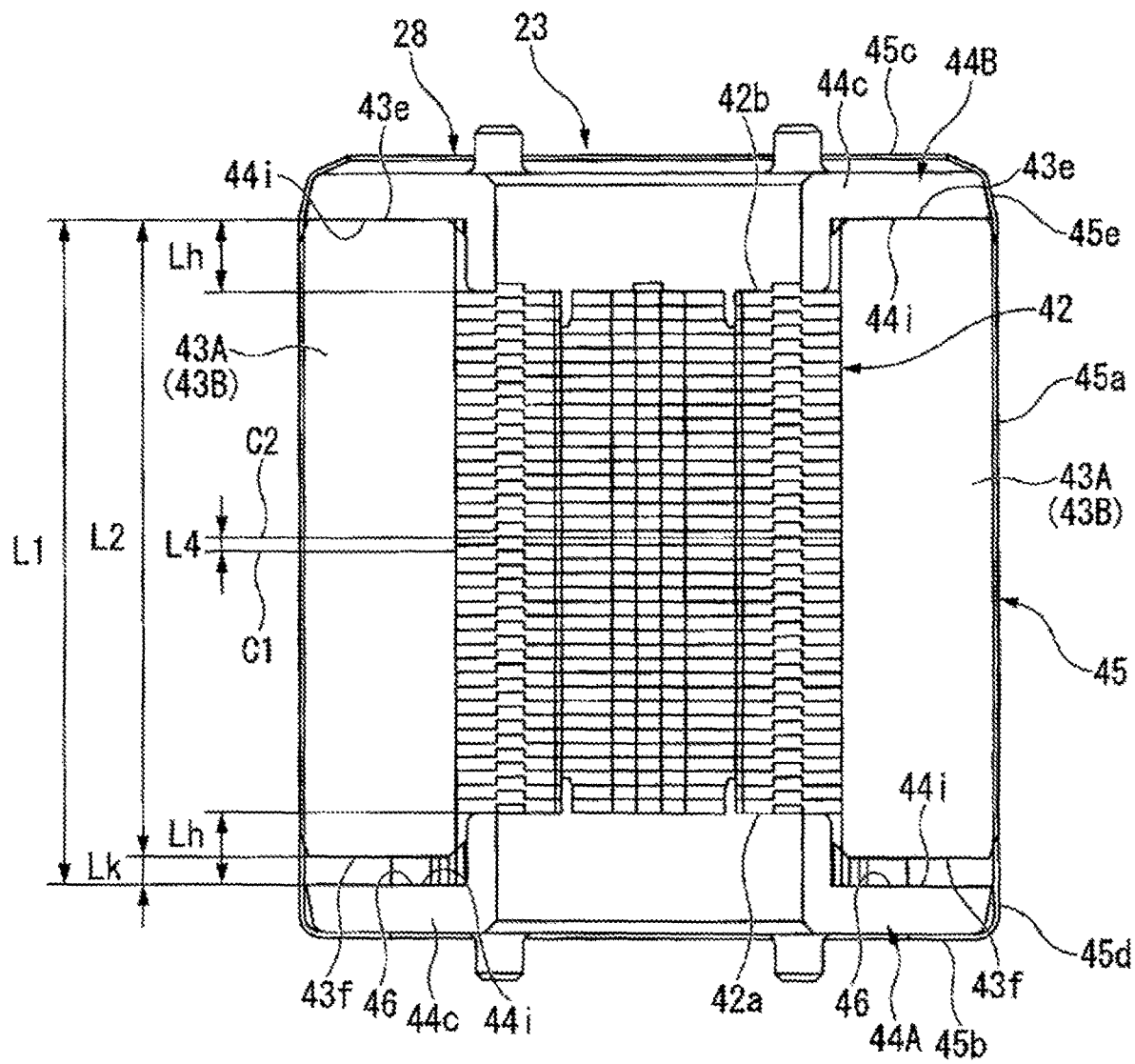
FIG. 4 is a cross-sectional view showing the rotor according to an embodiment of the disclosure.
Figure 5:
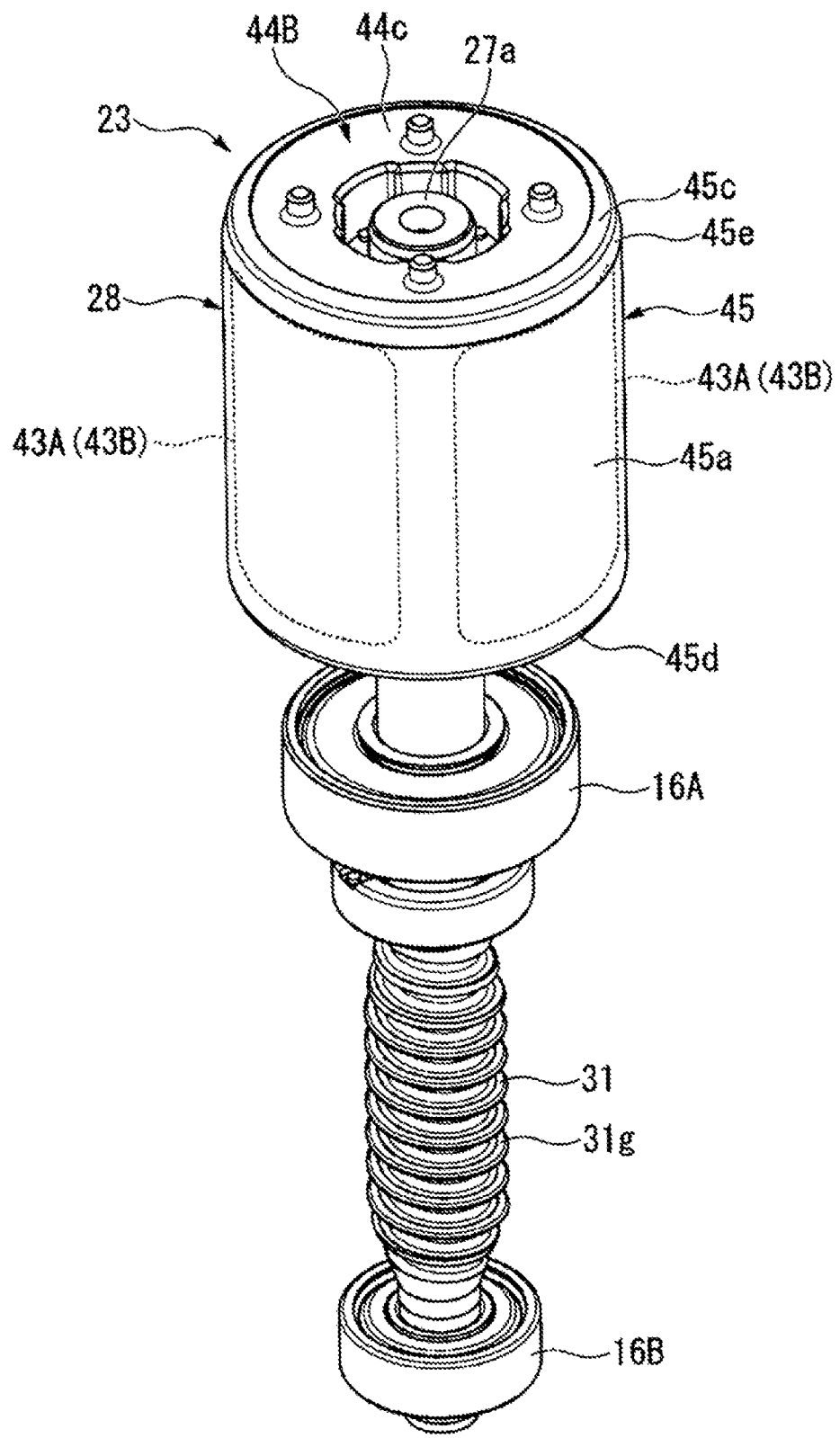
FIG. 5 is a perspective view of the rotor according to an embodiment of the disclosure.

FIG. 4 is a cross-sectional view showing the rotor 23. FIG. 5 is a perspective view of the rotor 23.

As shown in FIGS. 4 and 5, the rotor 23 has a rotation shaft 27 and a rotor body 28 fitted and fixed to the rotation shaft 27. Further, in the following description, the axial direction of the rotation shaft 27 is simply referred to as the axial direction.

The rotor body 28 includes a rotor core 42 press-fitted to the rotation shaft 27, magnets (also referred to as "rotor magnets") 43A and 43B attached to the rotor core 42, and first and second magnet holders (holders) 44A and 44B and a magnet cover 45 for holding the magnets 43A and 43B.

The first and second magnet holders 44A and 44B are disposed to sandwich the magnets 43A and 43B in the axial direction. In this way, the first and second magnet holders 44A and 44B prevent the magnets 43A and 43B from falling off from the rotor core 42 in the axial direction.

<Rotor Core>

Figure 6:
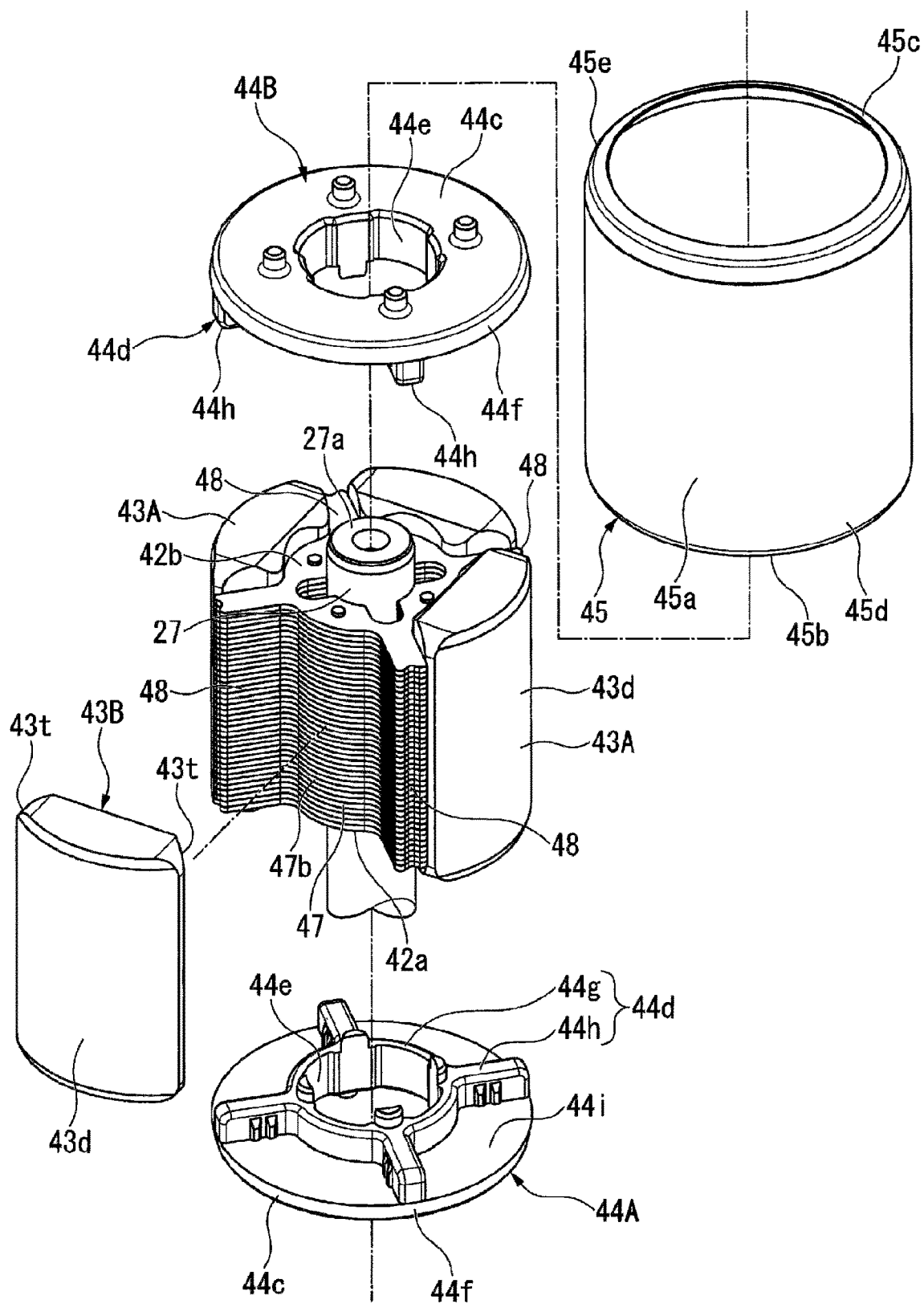
FIG. 6 is an exploded perspective view of the rotor according to an embodiment of the disclosure.

FIG. 6 is an exploded perspective view of the rotor 23.

As shown in FIGS. 5 and 6, the rotation shaft 27 is integrally molded with the worm shaft 31 that configures the speed reducer unit 30 (see also FIG. 2). The rotor core 42 is attached to an end part (one end) 27*b* (see FIG. 3) of the rotation shaft 27 on an end surface 27*a* side. The rotor core 42 rotates integrally with the rotation shaft 27 by being press-fitted to the outer periphery of the rotation shaft 27. The rotor core 42 is formed by laminating a plurality of metal plates in the axial direction. Further, the rotor core 42 is not limited to the case of being formed by laminating a plurality of steel plates in the axial direction, and may be formed by press-molding soft magnetic powder, for example.

The rotor core 42 has a core base end part 47 formed in a cylindrical shape and a plurality of core protrusions 48 protruding outward in the radial direction from the core base end part 47. A through hole 47*a* penetrating in the axial direction is formed at the radial direction center of the core base end part 47. The rotation shaft 27 is press-fitted to the through hole 47*a* (see also FIG. 3). Further, the rotation shaft 27 may be inserted into the through hole 47*a*, and the rotor core 42 may be externally fitted and fixed to the rotation shaft 27 using an adhesive or the like. For example, there are four core protrusions 48 protruding at equal intervals at intervals of 90° in the circumferential direction.

<Magnet>

Figure 7:
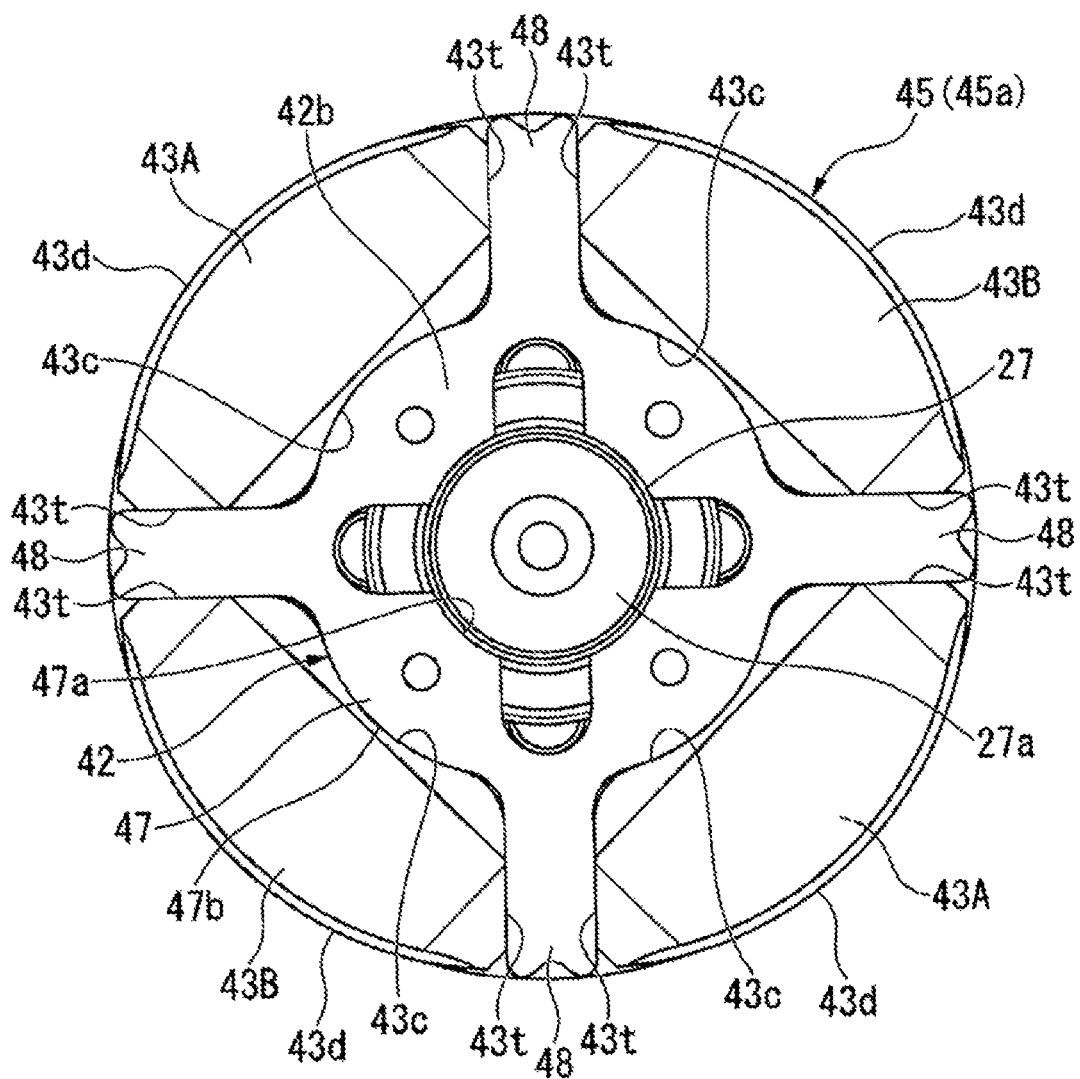
FIG. 7 is a plan view of the rotor magnets and the rotor core of the rotor according to an embodiment of the disclosure as viewed from the axial direction of the rotation shaft.

FIG. 7 is a plan view of the rotor magnets 43A and 43B and the rotor core 42 of the rotor 23 as viewed from the axial direction.

As shown in FIGS. 6 and 7, the magnets 43A and 43B are disposed between the core protrusions 48 adjacent to each other in the circumferential direction. The magnets 43A and 43B are segment-type magnets whose cross section in the axial direction is in a fan shape. Four magnets 43A and 43B are disposed in an annular shape on an outer peripheral surface (outer peripheral part) 47*b* of the core base end part 47 to be arranged in the circumferential direction. The magnets 43A and 43B are made of, for example, ferrite magnets. Here, since there are four magnets 43A and 43B, each of them is formed in a fan shape with a central angle $\theta < 90°$.

The magnets 43A and 43B are both magnetized from an inner diameter surface (inner peripheral surface) 43*c* formed of an arc surface toward an outer diameter surface (outer peripheral surface) 43*d*. When the magnets 43A and 43B are disposed in an annular shape on the outer peripheral surface of the rotor core 42, the magnetic poles of the outer diameter surfaces 43*d* are set to be arranged alternately in the circumferential direction with opposite polarities. That is, two types of magnets 43A and 43B magnetized in opposite polarities are prepared, and they are alternately disposed along the circumferential direction on the outer peripheral surface 47*b* of the core base end part 47. Therefore, the rotor body 28 having the assembly of the magnets 43A and 43B has a 4-pole magnetic pole.

In the magnets 43A and 43B, the inner diameter surfaces 43*c* and the outer diameter surfaces 43*d* are formed as arc surfaces. In a state where the segment type magnets 43A and 43B are disposed between the core protrusions 48 adjacent to each other in the circumferential direction, both end surfaces 43*t* of the magnets 43A and 43B in the circumferential direction are brought into contact with the adjacent core protrusions 48. As a result, it is possible to prevent the positions of the magnets 43A and 43B from deviating with respect to the rotation direction of the rotor 23.

Further, the magnets 43A and 43B overhang on both sides in the axial direction with respect to the rotor core 42 and the stator core 24. The overhang means a state where both end surfaces of the magnets 43A and 43B in the axial direction protrude from core end surfaces 42*a* and 42*b* on both sides of the rotor core 42 in the axial direction.

<Magnet Holder>

The first and second magnet holders 44A and 44B include magnet holding parts 44*c* in an annular shape and core holding parts 44*d* integrally formed with the magnet holding parts 44*c*. Examples of the materials of the first and second magnet holders 44A and 44B include non-magnetic resin materials.

The magnet holding part 44*c* is formed in a flat annular shape by forming an opening edge 44*e* at the radial direction center and an outer peripheral edge 44*f* in an arc shape. In the magnet holding part 44*c*, the core holding part 44*d* is integrally formed on an inner wall surface 44*i* which is a surface on the magnets 43A and 43B side. The core holding part 44*d* has an annular part 44*g* and a plurality of protrusions 44*h* that extend outward in the radial direction from the annular part 44*g*.

The annular part 44*g* is formed in an annular shape on the inner wall surface 44*i* of the magnet holding part 44*c* and along the opening edge 44*e*.

The plurality of protrusions 44*h* extend and radiate outward in the radial direction from the annular part 44*g* to the outer peripheral edge 44*f* along the inner wall surface 44*i* of the magnet holding part 44*c*. For example, there are four protrusions 44*h* protruding at equal intervals at intervals of 90° in the circumferential direction.

The end surface of the core base end part 47 of the rotor core 42 is brought into contact with the annular part 44*g*. The end surfaces of the core protrusions 48 of the rotor core 42 is brought into contact with the protrusions 44*h*. Specifically, the first magnet holder 44A is in contact with the core end surface (end surface) 42*a* on the opposite side of the end surface 27*a* of the rotation shaft 27 among the core end surfaces 42*a* and 42*b* on both sides of the rotor core 42 (see also FIG. 4). Further, the second magnet holder 44B is in contact with the core end surface (end surface) 42*b* on the side of the end surface 27*a* of the rotation shaft 27 among the core end surfaces 42*a* and 42*b* on both sides of the rotor core 42.

That is, the first magnet holder 44A and the second magnet holder 44B are disposed on the core end surfaces 42*a* and 42*b* on both sides of the rotor core 42 to sandwich the rotor core 42 in the axial direction. The magnets 43A and 43B are disposed between the first magnet holder 44A and the second magnet holder 44B. That is, the magnets 43A and 43B are held by the first and second magnet holders 44A and 44B to be movable in the axial direction and to be restricted from moving more than a predetermined amount in the axial direction.

<Magnet Cover>

The outer peripheries of the first magnet holder 44A, the second magnet holder 44B, the rotor core 42, and the magnets 43A and 43B are covered by the magnet cover 45. Further, the first and second magnet holders 44A and 44B are held by the magnet cover 45. Examples of the material of the magnet cover 45 include non-magnetic materials such as stainless steel.

The magnet cover 45 has a cylindrical part 45a that covers the outer diameter surfaces 43d of the magnets 43A and 43B, and a first flange 45b and a second flange 45c that are integrally formed at both ends of the cylindrical part 45a in the axial direction. The cylindrical part 45a is formed in a hollow cylindrical shape. The inner peripheral surface of the cylindrical part 45a is in contact with the outer diameter surfaces 43d of the magnets 43A and 43B. As a result, the magnets 43A and 43B are held (fixed) and held by the cylindrical part 45a in a state where both end surfaces 43t of the magnets 43A and 43B are in contact (close contact) with the core protrusions 48 of the rotor core 42.

The first flange 45b (see also FIG. 4) of the cylindrical part 45a protrudes inward in the radial direction from one end 45d on the opposite side of the end surface 27a of the rotation shaft 27. The first flange 45b is in contact with the surface of the magnet holding part 44c of the first magnet holder 44A.

The second flange 45c of the cylindrical part 45a protrudes inward in the radial direction from the other end 45e on the side of the end surface 27a of the rotation shaft 27. The second flange 45c is in contact with the surface of the magnet holding part 44c of the second magnet holder 44B.

In this way, the first flange 45b is brought into contact with the surface of the magnet holding part 44c of the first magnet holder 44A. Further, the second flange 45c is brought into contact with the surface of the magnet holding part 44c of the second magnet holder 44B. As a result, the first magnet holder 44A and the second magnet holder 44B are held integrally with the rotor core 42 by the magnet cover 45.

That is, in the rotor 23, for example, in a state where the rotor core 42 is fixed to the rotation shaft 27, the magnets 43A and 43B are fixed to the rotor core 42 by the cylindrical part 45a of the magnet cover 45. Further, the first and second magnet holders 44A and 44B are fixed to the rotor core 42 by the first flange 45b and the second flange 45c of the magnet cover 45. As a result, the rotor 23 is integrally assembled by the rotation shaft 27, the rotor core 42, the magnets 43A and 43B, the first and second magnet holders 44A and 44B, and the magnet cover 45.

Further, in the embodiment, an example of fixing the magnets 43A and 43B by the magnet cover 45 is described, but the magnets 43A and 43B may be fixed by an adhesive.

<Positional Relationship of Rotor Core, Magnets, and Stator Core in Axial Direction>

Hereinafter, the positional relationship of the rotor core 42, the magnets 43A and 43B, and the stator core 24 in the axial direction will be described with reference to FIGS. 3 and 4.

As shown in FIG. 4, a holder space 46 is formed between the first magnet holder 44A and the second magnet holder 44B.

Here, the length of the holder space 46 in the axial direction, that is, the length between the inner wall surfaces 44i of the magnet holders 44A and 44B facing each other in the axial direction, is L1, and the magnet length of the magnets 43A and 43B in the axial direction is L2, and the lengths L1 and L2 satisfy:

$$L1>L2 \qquad (1).$$

Therefore, the magnets 43A and 43B can be held at any positions in the axial direction in the holder space 46 between the first magnet holder 44A and the second magnet holder 44B.

In the embodiment, for example, in the magnets 43A and 43B, the magnet end surfaces 43e in the axial direction are in contact with the magnet holding part 44c of the second magnet holder 44B. Further, in the magnets 43A and 43B, the magnet end surfaces 43f in the axial direction are disposed at an interval in the axial direction with respect to the magnet holding part 44c of the first magnet holder 44A. That is, a space having a space length Lk is formed between the magnet end surfaces 43f and the magnet holding part 44c. The space length Lk satisfies:

$$L1-L2=Lk \qquad (2).$$

In the embodiment, an example in which the magnet end surfaces 43e are brought into contact with the magnet holding part 44c is described, but the magnet end surfaces 43e may be disposed close to the magnet holding part 44c.

Further, a first holder length Lh between the core end surface 42a of the rotor core 42 and the inner wall surface 44i of the magnet holding part 44c in the first magnet holder 44A and a second holder length Lh between the core end surface 42b of the rotor core 42 and the inner wall surface 44i of the magnet holding part 44c in the second magnet holder 44B are equal lengths.

Here, the magnet end surfaces 43e are brought into contact with the magnet holding part 44c, and a space having the space length Lk is formed between the magnet end surfaces 43f and the magnet holding part 44c. Therefore, in the magnets 43A and 43B, a magnet central position C2 in the axial direction is deviated (offset) toward the end surface 27a side in the axial direction with respect to a rotor central position C1. In other words, the rotor central position C1 is disposed closer to the center of the rotation shaft 27 than the magnet central position C2 (that is, closer to the other end on the opposite side of the end part (one end) 27b of the rotation shaft 27 shown in FIG. 3). Here, the specific gravity of the rotor core 42 is generally greater than the specific gravity of the magnets 43A and 43B.

As shown in FIG. 3, the rotor central position C1 is deviated (offset) to the opposite side of the end surface 27a of the rotation shaft 27 in the axial direction with respect to a stator central position C3. The offset length L3 between the rotor central position C1 and the stator central position C3 is greater than the space length Lk. In other words, the space length Lk is set to be less than the offset length L3. Therefore, the offset length L3 is set to be greater than an offset length L4 of the magnet central position C2 with respect to the rotor central position C1. That is, the length L1 between the inner wall surfaces 44i of the magnet holders 44A and 44B facing each other in the axial direction, the magnet length L2 of the magnets 43A and 43B in the axial direction, and the offset length L3 satisfy:

$$L1-L2<L3 \qquad (3).$$

Further, in the magnets 43A and 43B, the magnet holding part 44c on the side opposite to the offset direction of the rotor central position C1 with respect to the stator central position C3 is in contact with the magnet end surfaces 43e. As a result, the magnet central position C2 is disposed between the stator central position C3 and the rotor central position C1 in the axial direction. That is, the stator central position C3, the magnet central position C2 and the rotor central position C1 are disposed in this order in the direction away from the end surface 27a of the rotation shaft 27. In other words, the magnet central position C2 is located between the stator central position C3 and the rotor central position C1.

As described above, in the above-described motor unit 20, the rotor central position (that is, the central position of the rotor core 42) C1 is deviated from the stator central position C3 to the opposite side of the end surface 27a in the axial direction (that is, the central position side of the rotation shaft 27 of the rotor 23) by the offset length L3. Therefore, the magnet central position C2 is disposed on the central position side of the rotation shaft 27 of the rotor 23, and the weight of the magnet central position C2 is brought closer to the central position side of the rotation shaft 27. As a result, the dynamic unbalance of the rotor 23 can be suppressed when runout due to the rotation of the rotor 23 occurs.

Further, the specific gravity of the rotor core 42 is generally greater than the specific gravity of the magnets 43A and 43B. In addition, the rotor central position C1 is disposed closer to the center of the rotation shaft 27 than the magnet central position C2. As a result, the dynamic unbalance of the rotor 23 can be even further suppressed.

Further, the length L1 between the inner wall surfaces 44i of the magnet holders 44A and 44B facing each other in the axial direction, the magnet length L2 of the magnets 43A and 43B in the axial direction, and the offset length L3 satisfy the above equation (3). In other words, the magnet central position C2 is located between the stator central position C3 and the rotor central position C1. Therefore, the weight of the magnet central position C2 can be brought closer to the central position side of the rotation shaft 27 of the rotor 23, and the magnet central position C2 can be brought closer to the stator central position C3. As a result, magnetic flux leakage due to the mismatch between the magnet central position C2 and the stator central position C3 can be suppressed, and the effective magnetic flux of the magnets 43A and 43B can be made effectively contribute to the rotational torque of the rotor 23. Therefore, in the motor unit 20, a deterioration in the motor characteristics can be suppressed.

In this way, in the motor 1 with the speed reducer, the magnets 43A and 43B can be held at any position in the axial direction in the holder space 46 between the first magnet holder 44A and the second magnet holder 44B. Therefore, the magnets 43A and 43B can be biased toward the second magnet holder 44B side. As a result, the stator central position C3, the magnet central position C2, and the rotor central position C1 are offset in the axial direction and disposed separately, and the respective central positions C3, C2 and C1 are set to the optimal positions. Therefore, both the dynamic balance by the rotor 23 and the motor characteristics can be achieved.

<Speed Reducer Unit>

As shown in FIG. 2, the speed reducer unit 30 is configured by the worm shaft 31 and the worm wheel 32 engaged with the worm shaft 31.

The worm shaft 31 is formed as a part of the rotation shaft 27 by forming a spirally continuous worm gear part 31g on the outer peripheral surface of the rotation shaft 27 of the motor unit 20 in the intermediate part between the bearing parts 16A and 16B.

The worm gear part 31g is formed so that its outer diameter is greater than the outer diameter of the worm shaft 31 (rotation shaft 27). Such a worm gear part 31g is formed by rolling.

Further, the worm shaft 31 may be configured as a separate body from the rotation shaft 27 of the motor unit 20, and may be integrated by connecting the worm shaft 31 and the rotation shaft 27.

The worm wheel 32 has a disk shape, and has an outer peripheral gear part 32g engaged with the worm gear part 31g of the worm shaft 31 on the outer peripheral surface thereof. The worm wheel 32 is housed in the wheel housing recess 15 of the speed reducer housing part 13 of the housing body 11.

In the worm wheel 32, an output shaft 33 protruding from the radial direction center of the worm wheel 32 is provided on the side of the speed reducer housing part 13 facing the bottom part 13b. The output shaft 33 is disposed coaxially with the rotational center of the worm wheel 32. The tip part of the output shaft 33 protrudes to the outside of the housing body 11 through the through hole of the boss part 19 formed in the housing body 11. A spline 33a connected to an electrical component (not shown) is formed at the tip part of the output shaft 33.

<Operation of Motor with Speed Reducer>

Next, the operation of the motor 1 with the speed reducer will be described.

In the motor 1 with the speed reducer, a predetermined magnetic field is formed in the stator 22 (teeth 25) when electric power is supplied to each winding 26 of the motor unit 20 from a controller part (not shown). In response to this magnetic field, a magnetic attractive or repulsive force is generated between the magnetic field and the magnets 43A and 43B of the rotor 23. As a result, the rotor 23 continuously rotates. When the rotor 23 rotates, the worm shaft 31 integrated with the rotation shaft 27 rotates, and the worm wheel 32 engaged with the worm shaft 31 also rotates. Then, the output shaft 33 connected to the worm wheel 32 rotates, and a desired electric component is driven.

<Method for Manufacturing Motor>

Figure 8:
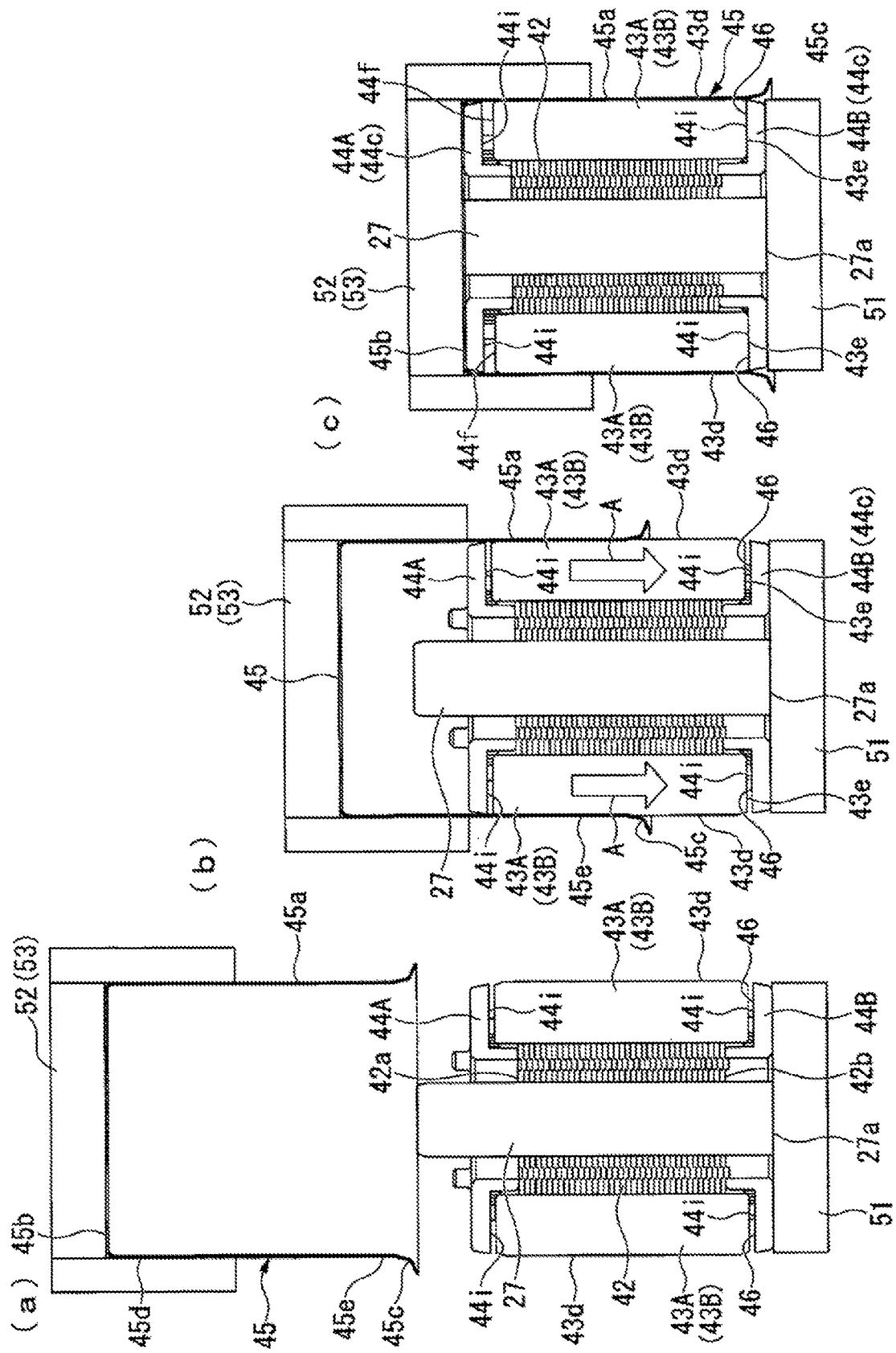
FIG. 8 is a cross-sectional view illustrating the manufacturing process of the rotor according to an embodiment of the disclosure, and (a) to (c) show each process.

Next, a method for manufacturing the rotor 23, specifically, a manufacturing process for the rotor 23 will be described with reference to FIG. 3, FIG. 4, and (a) to (c) of FIG. 8. FIG. 8 is a cross-sectional view illustrating the manufacturing process of the rotor 23, and (a) to (c) show each process.

As shown in (a) of FIG. 8, the first magnet holder 44A is in contact with the core end surface 42a of the rotor core 42 in a state where the rotor core 42 is fixed to the rotation shaft 27. Further, the second magnet holder 44B is in contact with the core end surface 42b of the rotor core 42. Further, the magnets 43A and 43B are disposed between the first magnet holder 44A and the second magnet holder 44B. Further, the magnets 43A and 43B are disposed between the adjacent core protrusions 48 (see FIG. 7).

In this state, the magnets 43A and 43B are disposed to be movable in the axial direction in the holder space 46 between the first magnet holder 44A and the second magnet holder 44B.

The rotation shaft 27, the rotor core 42, the first and second magnet holders 44A and 44B, and the magnets 43A and 43B assembled in this way are disposed on a mounting table 51. Above the rotation shaft 27, the rotor core 42, the first and second magnet holders 44A and 44B, and the magnets 43A and 43B that are assembled, the one end 45d side of the magnet cover 45 is gripped by a grip part 53 of a pressing machine 52. The second flange 45c on the other end 45e side of the magnet cover 45 is spread outward in the radial direction in an inclined shape (spreading shape) in an uncrimped state.

As shown in (b) of FIG. 8, the magnet cover 45 is lowered by the grip part 53 of the pressing machine 52. By lowering the magnet cover 45, the second flange 45c of the magnet cover 45 is fitted to the outer diameter surfaces 43d of the magnets 43A and 43B via the first magnet holder 44A in the direction of the arrow A. As a result, the cylindrical part 45a of the magnet cover 45 is fitted to the outer diameter surfaces 43d of the magnets 43A and 43B in a state of being press-fitted.

The magnets 43A and 43B move in the direction of the arrow A together with the cylindrical part 45a of the magnet cover 45. As a result, the magnet end surfaces 43e of the magnets 43A and 43B come into contact with the magnet holding part 44c of the second magnet holder 44B.

That is, the magnets 43A and 43B move to positions offset in the axial direction toward the end surface 27a side of the rotation shaft 27 with respect to the rotor core 42.

As shown in (c) of FIG. 8, the cylindrical part 45a is fitted to the outer diameter surfaces 43d of the magnets 43A and 43B in a press-fitted state. Therefore, the first flange 45b of the magnet cover 45 is pressed (contacted) against the surface of the magnet holding part 44c of the first magnet holder 44A/(magnet cover press-fitting process). In this state, the second flange 45c of the magnet cover 45 protrudes downward from the second magnet holder 44B. As shown in FIG. 4, by crimping the protruding second flange 45c of the magnet cover 45 inward in the radial direction, the second flange 45c comes into contact with the surface of the magnet holding part 44c of the second magnet holder 44B (magnet cover fixing process). As a result, as shown in FIG. 3, the rotation shaft 27, the rotor core 42, the magnets 43A and 43B, the first and second magnet holders 44A and 44B, and the magnet cover 45 are integrally assembled to form the rotor 23, and the manufacturing process of the rotor 23 is completed.

As described above, according to the method for manufacturing the rotor 23 (that is, the manufacturing process for the rotor 23), the magnets 43A and 43B are disposed to be movable in the axial direction in the holder space 46 between the first magnet holder 44A and the second magnet holder 44B. Therefore, by press-fitting the cylindrical part 45a of the magnet cover 45 to the outer diameter surfaces 43d of the magnets 43A and 43B, the magnets 43A and 43B can be biased with respect to the rotor core 42.

Specifically, the magnet central position C2 of the magnets 43A and 43B can be fixed in a state of being offset (biased) by the offset length L4 toward the end surface 27a side in the axial direction with respect to the rotor central position C1 of the rotor core 42. As a result, the rotor 23 in which the magnets 43A and 43B are biased can be easily manufactured. Further, the motor 1 with the speed reducer in which the magnet central position C2 is disposed between the stator central position C3 and the rotor central position C1 can be easily manufactured.

Further, the disclosure is not limited to the above-described embodiment and includes various modifications of the above-described embodiment without departing from the spirit of the disclosure.

For example, the case where the motor 1 with the speed reducer is a drive source for electrical components (such as wipers, power windows, sunroofs, electric seats, and the like) mounted on a vehicle has been described. However, the disclosure is not limited thereto, and the motor 1 with the speed reducer can be adopted for various electric devices. Further, it is also possible to adopt only the motor unit 20 for various electric devices.

What is claimed is:

1. A motor comprising:
   a stator comprising a winding and a stator core around which the winding is wound; and
   a rotor attached to one end of a rotation shaft and rotating in response to a magnetic field of the stator,
   wherein the rotor comprises:
      a rotor core rotating integrally with the rotation shaft;
      a magnet disposed on an outer peripheral part of the rotor core; and
      two holders provided at both ends of the rotor core in an axial direction of the rotation shaft to restrict a movement of the magnet in the axial direction,
   wherein lengths between end surfaces of the rotor core and inner wall surfaces of each of the holders facing the end surfaces of the rotor core in the axial direction are equal,
   a central position of the stator core in the axial direction, a central position of the rotor core in the axial direction, and a central position of the magnet in the axial direction are deviated from each other, and
   the central position of the magnet in the axial direction is located between the central position of the stator core in the axial direction and the central position of the rotor core in the axial direction.

2. The motor according to claim 1, wherein the magnet is in contact with the holder on a side opposite to a deviation direction of the rotor core with respect to the stator core.

3. The motor according to claim 1, wherein the central position of the rotor core in the axial direction is closer to another end of the rotation shaft than the central position of the magnet in the axial direction.

4. The motor according to claim 1, further comprising:
   a magnet cover which covers an outer peripheral surface of the magnet and whose inner peripheral surface is in contact with the outer peripheral surface of the magnet.

5. The motor according to claim 1, wherein a specific gravity of the rotor core is greater than a specific gravity of the magnet.

6. A method for manufacturing the motor according to claim 1, the method comprising:
   a magnet cover press-fitting process of press-fitting a magnet cover that covers an outer peripheral surface of the magnet to the outer peripheral surface of the magnet and pressing one end of the magnet cover against the holder in a state where the magnet is disposed on an outer peripheral part of the rotor core; and
   after the magnet cover press-fitting process, a magnet cover fixing process of bringing another end of the magnet cover into contact with the holder and crimping it to the holder.

7. The motor according to claim 1, wherein a length between inner wall surfaces of the two holders facing each other in the axial direction is set to L1, a length of the magnet in the axial direction set to L2, and a length between the central position of the stator core in the axial direction and the central position of the rotor core in the axial direction set to L3,
   the lengths L1, L2, and L3 satisfy L1−L2<L3.

* * * * *